US006185431B1

(12) United States Patent
Li et al.

(10) Patent No.: US 6,185,431 B1
(45) Date of Patent: Feb. 6, 2001

(54) MOBILE STATION CLOSED LOOP OUTPUT POWER STABILITY SYSTEM FOR WEAK SIGNAL CONDITIONS

(75) Inventors: Kaiping Li, Mount Freedom, NJ (US); Chung-yen Ong, Norcross, GA (US)

(73) Assignee: Oki Telecom, Inc., Suwanee, GA (US)

( * ) Notice: Under 35 U.S.C. 154(b), the term of this patent shall be extended for 0 days.

(21) Appl. No.: 09/040,555

(22) Filed: Mar. 18, 1998

Related U.S. Application Data

(60) Provisional application No. 60/050,436, filed on Jun. 18, 1997, provisional application No. 60/050,241, filed on Jun. 19, 1997, and provisional application No. 60/058,434, filed on Sep. 10, 1997.

(51) Int. Cl.[7] .................................................. H04B 7/00
(52) U.S. Cl. ............................................. 455/522; 455/69
(58) Field of Search ................................ 455/522, 69, 70, 455/67.1, 68, 517, 524, 63, 504, 505

(56) References Cited

U.S. PATENT DOCUMENTS

| 4,261,054 | 4/1981 | Scharla-Nielsen | 455/13.4 |
|---|---|---|---|
| 4,510,460 | 4/1985 | Tamura | 330/285 |
| 4,602,218 | 7/1986 | Vilmur et al. | 330/279 |
| 4,636,741 | 1/1987 | Mitzlaff | 330/127 |
| 4,811,421 | 3/1989 | Havel et al. | 455/69 |

(List continued on next page.)

FOREIGN PATENT DOCUMENTS

| WO 91/07037 | 5/1991 | (WO) | H04L/27/30 |
|---|---|---|---|
| WO 92/21196 | 11/1992 | (WO) | H04L/27/30 |
| WO 93/07702 | 4/1993 | (WO) | H04L/27/30 |
| WO 95/23460 | 8/1995 | (WO) | H04B/7/005 |
| WO 97/24800 | 7/1997 | (WO) | H03F/3/60 |
| WO 97/34439 | 9/1997 | (WO) | H04Q/7/38 |

OTHER PUBLICATIONS

"On the System Design Aspects of Code Divison Multiple Access (CDMA) Applied to Digital Cellular and Personal Communications Networks", Gilhousen et al., 41st IEEE Vehicular Technology Conference, May 19–22, 1991, St Louis, MO, pp. 57–62.*

CDMA Digital Cellular An ASIC Overview; Richard Kerr; Fall 1993; Applied Microwave & Wireless pp. 30–41.

*Primary Examiner*—Fan Tsang
*Assistant Examiner*—Rafael Perez-Gutierrez
(74) *Attorney, Agent, or Firm*—Thomas, Kayden, Horstemeyer & Risley, LLP

(57) ABSTRACT

A power control system is implemented within a mobile communications system to prevent erroneous power fluctuations by a mobile station when the power of signals communicated between the mobile station and a base station becomes so weak that the mobile station would otherwise erroneously interpret power control signals communicated from the base station to the mobile station. By configuring the mobile station to ignore power control signals communicated by the base station when a received signal strength is below a power control threshold, erroneous changes in power output can be prevented and the overall performance of the communication system can be increased.

21 Claims, 8 Drawing Sheets

U.S. PATENT DOCUMENTS

| | | | |
|---|---|---|---|
| 4,870,698 | 9/1989 | Katsuyama et al. | 455/67.1 |
| 5,036,532 | 7/1991 | Metroka et al. | 455/566 |
| 5,056,109 | 10/1991 | Gilhousen et al. | 375/130 |
| 5,093,840 | 3/1992 | Schilling | 375/130 |
| 5,107,225 | 4/1992 | Wheatley, III et al. | 330/279 |
| 5,107,487 | 4/1992 | Vilmur et al. | 370/342 |
| 5,129,098 * | 7/1992 | McGirr et al. | 455/69 |
| 5,144,258 | 9/1992 | Nakanishi et al. | 330/129 |
| 5,241,690 | 8/1993 | Larsson et al. | 455/522 |
| 5,257,283 | 10/1993 | Gilhousen et al. | 375/130 |
| 5,265,119 | 11/1993 | Gilhousen et al. | 370/335 |
| 5,267,262 | 11/1993 | Wheatley, III | 375/130 |
| 5,278,992 | 1/1994 | Su et al. | 455/69 |
| 5,283,536 | 2/1994 | Wheatley, III et al. | 330/279 |
| 5,299,226 * | 3/1994 | Schilling | 455/522 |
| 5,345,598 * | 9/1994 | Dent | 455/522 |
| 5,383,219 | 1/1995 | Wheatley, III et al. | 375/130 |
| 5,442,322 | 8/1995 | Kornfeld et al. | 330/285 |
| 5,452,473 | 9/1995 | Weiland et al. | 455/88 |
| 5,461,639 | 10/1995 | Wheatley, III et al. | 370/342 |
| 5,467,055 | 11/1995 | Wray et al. | 330/129 |
| 5,485,486 | 1/1996 | Gilhousen et al. | 375/206 |
| 5,528,593 | 6/1996 | English et al. | 370/391 |
| 5,542,111 | 7/1996 | Ivanov et al. | 455/126 |
| 5,564,074 * | 10/1996 | Juntti | 455/67.1 |
| 5,574,747 * | 11/1996 | Lomp | 455/522 |
| 5,590,408 | 12/1996 | Weiland et al. | 455/69 |
| 5,603,096 | 2/1997 | Gilhousen et al. | 455/69 |
| 5,604,730 | 2/1997 | Tiedemann, Jr. | 370/252 |
| 5,631,921 * | 5/1997 | Schilling | 455/522 |
| 5,655,220 | 8/1997 | Weiland et al. | 455/69 |
| 5,689,815 * | 11/1997 | Yamazaki et al. | 455/69 |
| 5,710,982 * | 1/1998 | Laborde et al. | 455/69 |
| 5,719,898 * | 2/1998 | Davidovici et al. | 375/130 |
| 5,745,842 * | 4/1998 | Priest | 455/69 |
| 5,761,622 * | 6/1998 | Priest | 455/522 |
| 5,787,338 * | 7/1998 | Priest | 455/522 |
| 5,790,940 * | 8/1998 | Laborde et al. | 455/69 |
| 5,799,005 * | 8/1998 | Soliman | 370/335 |
| 5,809,061 * | 9/1998 | Shea et al. | 375/141 |
| 5,822,318 * | 10/1998 | Tiedmann, Jr. et al. | 370/391 |
| 5,835,527 * | 11/1998 | Lomp | 455/522 |
| 5,887,245 * | 3/1999 | Lindroth et al. | 455/69 |
| 5,933,761 * | 8/1999 | Willenegger et al. | 455/522 |
| 6,018,544 * | 1/2000 | Kotzin et al. | 455/522 |
| 6,018,650 * | 1/2000 | Petsko et al. | 455/234.1 |

* cited by examiner

DISTANCE FROM BASE STATION

DISTANCE FROM BASE STATION

| PWR_CNTL_THRESH$_S$ | Power Control Threshold (dB) | |
|---|---|---|
| | Rate Set 1 | Rate Set 2 |
| 0 | -infinity | -infinity |
| 1 | -21 | -18 |
| 2 | -19 | -16 |
| 3 | -17 | -14 |

FIG. 8

MOBILE STATION CLOSED LOOP OUTPUT POWER STABILITY SYSTEM FOR WEAK SIGNAL CONDITIONS

CROSS-REFERENCE TO RELATED APPLICATIONS

This application claims the benefit of U.S. Provisional Application No. 60/050,436, filed Jun. 18, 1997, U.S. Provisional Application No. 60/050,241, filed Jun. 19, 1997, and U.S. Provisional Application No. 60/058,434, filed Sep. 10, 1997.

BACKGROUND OF THE INVENTION

The present invention relates generally to the field of wireless telecommunications, and more specifically, to the field of mobile station closed loop power control under weak signal conditions in wireless telecommunications systems, such as code division multiple access (CDMA) wireless telephone systems.

One of the primary standard specifications relevant to the present invention is TIA/EIA/IS-95-A "Mobile Station-Base Station Compatibility Standard for Dual-Mode Wideband Spread Spectrum Cellular System." This CDMA industry standard specification is considered understood by those reasonably skilled in the art of the present invention. The invention disclosed herein is applicable to other variants of CDMA technology, other than TIA/EIA/IS-95-A.

In CDMA wireless telephone systems (including cellular systems, personal communications systems, satellite communications systems, etc.) power control is crucial to the functionality of the communications system. The available number of simultaneous connections is a function of the transmitted power of the mobile and base stations in the CDMA system. If the mobile and base stations are transmitting at power levels higher than necessary, the overall noise level in the system in increased due to interference between the transmitted signals, thus reducing system capacity. If the mobile and base stations are transmitting power levels lower than necessary, the performance of the CDMA system will be sub-par. Also, since the distance, therefore the received power, between the different mobile stations and the base station will be different, each mobile station and base station pair will be transmitting at a different power level. This implies that transmitted power control has to be performed on an individual basis.

There are two different types of power control, open loop power control and closed loop power control. Open loop power control in a mobile station is a gradual system which dictates that output power should increase as the strength of received signals from a base station decreases, and output power should decrease as received signal strengths increase. As specified in the TIA/EIA/IS-95-A standard, the closed loop power control is performed with the assistance of the base station. The base station measures the signal to noise ratio (SNR) of the signals received from a mobile station and makes a comparison of the measured SNR with a predetermined threshold. Depending on the result of the comparison, the base station will notify the mobile station via power control commands injected into the forward traffic channel to either increase or decrease its transmitted power.

In conditions with low received signal strength, i.e., when the mobile station is far from the base station or there is some large physical body blocking the reception of the transmitted signal, the simple injection of power control commands into the forward traffic channel is not a reliable method of transmitting control information to the mobile station because the injected power control commands are not encoded as is all other data in the CDMA system. In fact, in low received signal strength situations, the mobile station's version of the received power control command may be erroneous and may not represent the true intent of the base station. This can result in the mobile station erratically changing its power output due to unreliable power control data.

There is, therefore, a need in the industry for a system for addressing these and other related and unrelated problems.

SUMMARY OF INVENTION

The present invention is a system in a wireless CDMA telephone system for increasing the stability of the transmitted output power under weak signal conditions which includes the addition of an additional variable, power control threshold ($PWR\_CNTL\_THRESH_s$), to the CDMA system. The $PWR\_CNTL\_THRESH_s$ variable is added to control messages in the CDMA telephone system. The $PWR\_CNTL\_THRESH_s$ indicates the signal level below which the power control command should be considered unreliable. This variable can be communicated to the mobile station from the base station via several different control messages which it regularly sends to the mobile station. In the first preferred embodiment of the present invention, two bits will be used to represent values for $PWR\_CNTL\_THRESH_s$, giving the system a total of four different threshold values.

According to the first preferred embodiment of the present invention, after the mobile station becomes synchronized with the base station or alternatively, after the mobile station powers up, the mobile station sets the $PWR\_CNTL\_THRESH_s$ variable to value 0. This disables any effects of the $PWR\_CNTL\_THRESH_s$ variable. Through communication with the mobile station, if the base station senses that the mobile station is behaving erratically, by noticing a high variance in the transmitted output power from the mobile station according to one implementations the base station will send to the mobile station a control message with the $PWR\_CNTL\_THRESH_s$ set to a particular value in an attempt to make the operation of the mobile station more reliable, i.e., to reduce the variance of the output power. If after the setting of a particular threshold using the $PWR\_CNTL\_THRESH_s$ parameter, the variance of the output power does not decrease, the base station may decide to increase the threshold by sending additional messages with $PWR\_CNTL\_THRESH_s$ set at larger values.

According to the second preferred embodiment of the present invention, the mobile station will initialize with a pre-determined non-zero value for $PWR\_CNTL\_THRESH_s$ that will remain until the mobile station output power becomes erratic.

According to the third preferred embodiment of the present invention, the mobile station has a specific value for $PWR\_CNTL\_THRESH_s$ hard coded into its circuitry and will always use this hard coded value.

It is therefore an object of the present invention to improve the reliability of the closed loop power control system.

Another object of the present system is to better handle the different operating conditions between each base station and mobile station pair by providing a more robust power control system.

Yet another object of the present system is to increase the overall system capacity of the CDMA system by having each mobile station transmitting at the optimum power level.

Yet another object of this invention is to make the mobile station more immune to the effects of power control commands from multiple base stations when the mobile station is at the edge of multiple base station coverage ranges.

Other objects, features, and advantages of the present invention will become apparent upon reading and understanding the present specifications, when taken in conjunction with accompanying drawings.

BRIEF DESCRIPTION OF THE DRAWINGS

FIG. 8 is a table of example power control threshold values, in accordance with a preferred embodiment of the present invention.

DETAILED DESCRIPTION OF THE PREFERRED EMBODIMENTS

Figure 1:
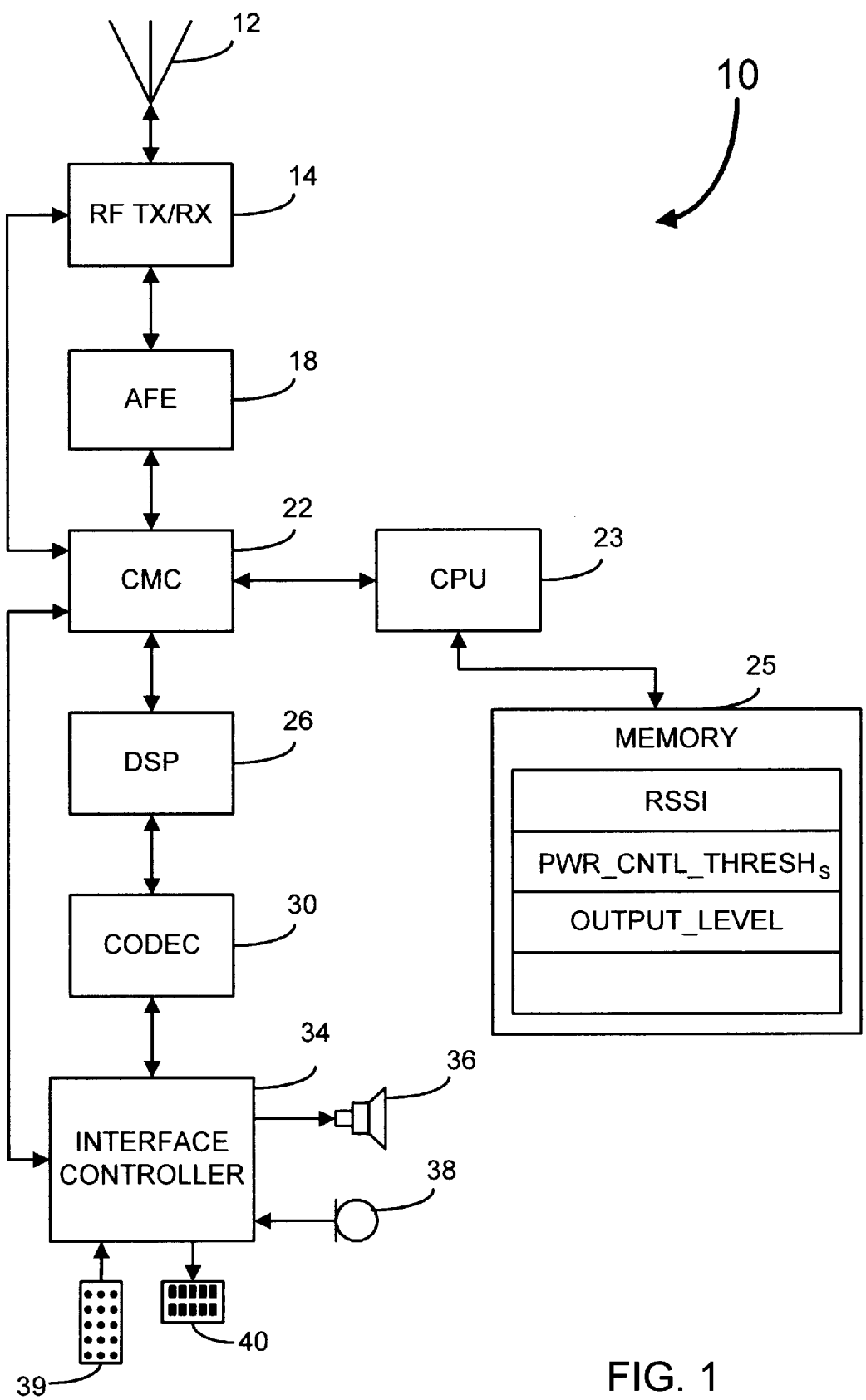
FIG. 1 is a block diagram representation of a CDMA wireless telephone in accordance with a first preferred embodiment of the present invention.

Refer now in greater detail to the drawings in which like numerals represent like components throughout the several views, FIG. 1 shows a block diagram of a code division multiple access (CDMA) wireless telephone 10 in accordance with a first preferred embodiment of the present invention. The diagram additionally applies to a variety of wireless telephones of alternate embodiments of the present invention, including dual mode cellular and PCS telephones. According to the first preferred embodiment of the present invention, radio signals are received through an antenna 12 and then filtered, mixed to lower frequencies, automatic gain controlled, and I and Q demodulated (separating the combined received signal into its in-phase (I) and quadrature-phase (Q) components) in a radio frequency transmit/receive (RF TX/RX) circuit 14 before being converted, in an analog front end (AFE) 18, from analog to digital and supplied to a CDMA modem circuit (CMC) 22.

A central processing unit (CPU) 23, is interfaced to a memory unit 25 comprising storage for a received signal strength indicator (RSSI) value, a power control threshold (PWR_CNTL_THRESH$_s$) value, an output transmitted power level value among other stored values. The RSSI value is calculated in the CMC 22 and stored in the memory unit 25. The PWR_CNTL_THRESH$_s$ is communicated to the wireless telephone 10 by the base station, and the output transmitted power level is a value that sets the gain in a variable output amplifier (not shown) in the RF TX/RX 14. As controlled by the CPU 23 the CMC 29 demodulates the I and Q signals into an interleaved signal stream which. according to the first preferred embodiment of the present invention, is deinterleaved, Viterbi decoded and digitally speech decoded by a digital signal processor (DSP) 26 before being decoded by a coder/decoder (CODEC) 30 into an audio signal which is controllably amplified by an interface controller 34 and output through a telephone speaker 36. Likewise, a reverse path is followed through the wireless telephone 10 as the telephone microphone 38 detects user speech. A keypad 39 and a display 40 provide conventional user input and output.

Figure 2:
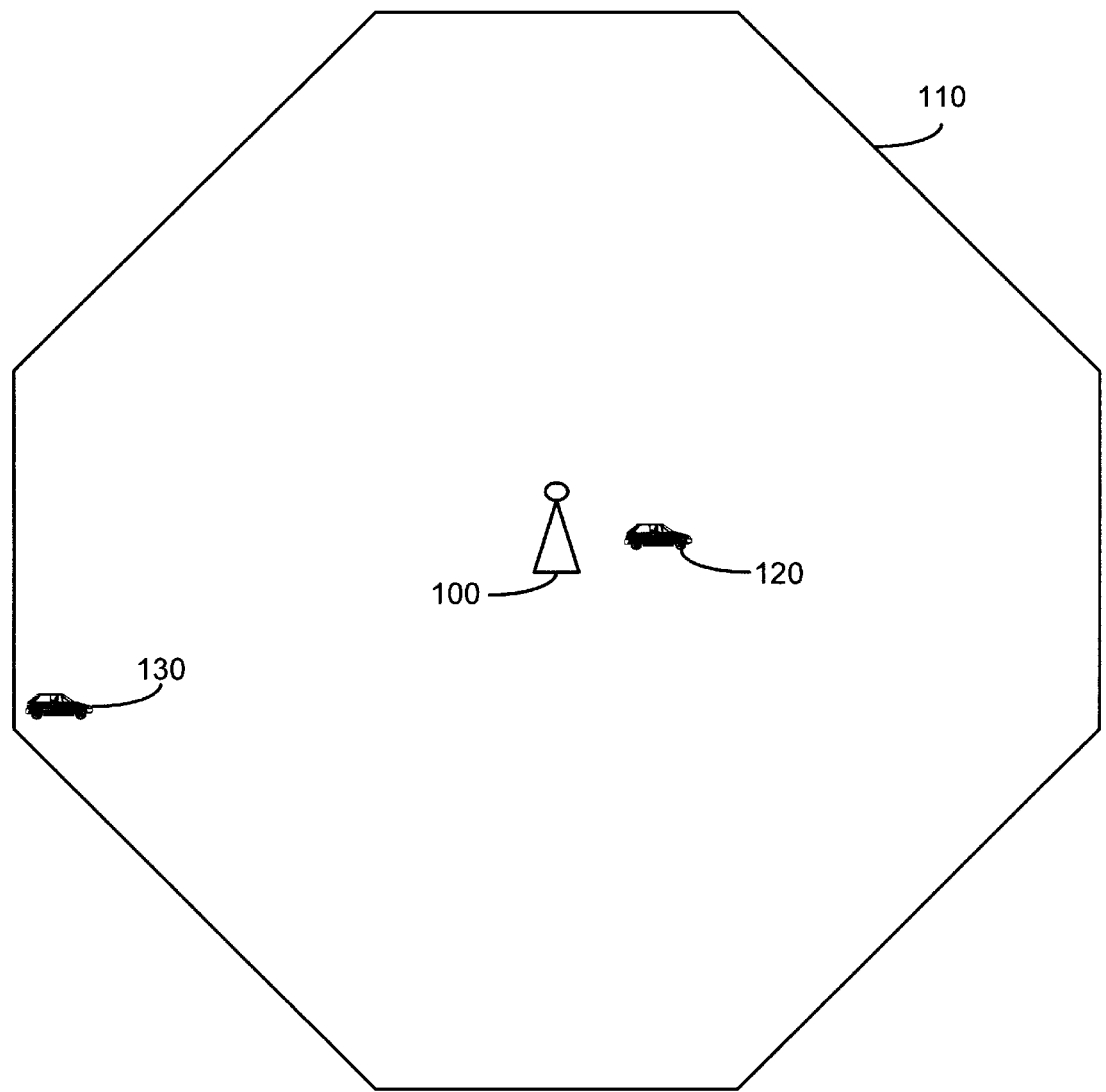
FIG. 2 is a block diagram representation of a CDMA base station and multiple mobile stations, in accordance with a first preferred embodiment of the present invention.

Refer now to FIG. 2 for a block diagram of a CDMA base station 100, its effective operating boundary 110, and multiple mobile stations 120 and 130. Mobile station 120 is close to the base station 100, therefore, the transmitted signals from the base station will be received at the mobile station 120 clearly. Furthermore, the transmitted signals from the mobile station 120 will be received at the base station 100 clearly. Mobile station 130 is at the edge of the effective operating boundary 110 of the base station 100. Therefore, signals transmitted from the base station 100 will be relatively weak when they arrive at the mobile station 130. The same is true for signals originating at the mobile station 130. Obviously, if mobile station 120 is transmitting at the same output power as the mobile station 130, the signal from the mobile station 120 will overwhelm the signal from mobile station 130. Through closed loop power control, the base station 100 notifies the mobile station 120 to lower its output power and mobile station 130 to raise its output power so that signals from both mobile stations 120 and 130 will arrive at the base station 100 with approximately the same power.

Another problem occurs when the mobile station 120 is in the fringe coverage area between multiple base stations. When more than one base station is communicating with the mobile station 120, typically, one base station will have a stronger signal than the other(s). Since TIA/EIA/IS-95-A specifies that the power control command which specifies power down will always be chosen over one that specified power up, an erroneously received power control command, i.e., a power up command received as a power down command can result in a dropped connection.

Figure 3:
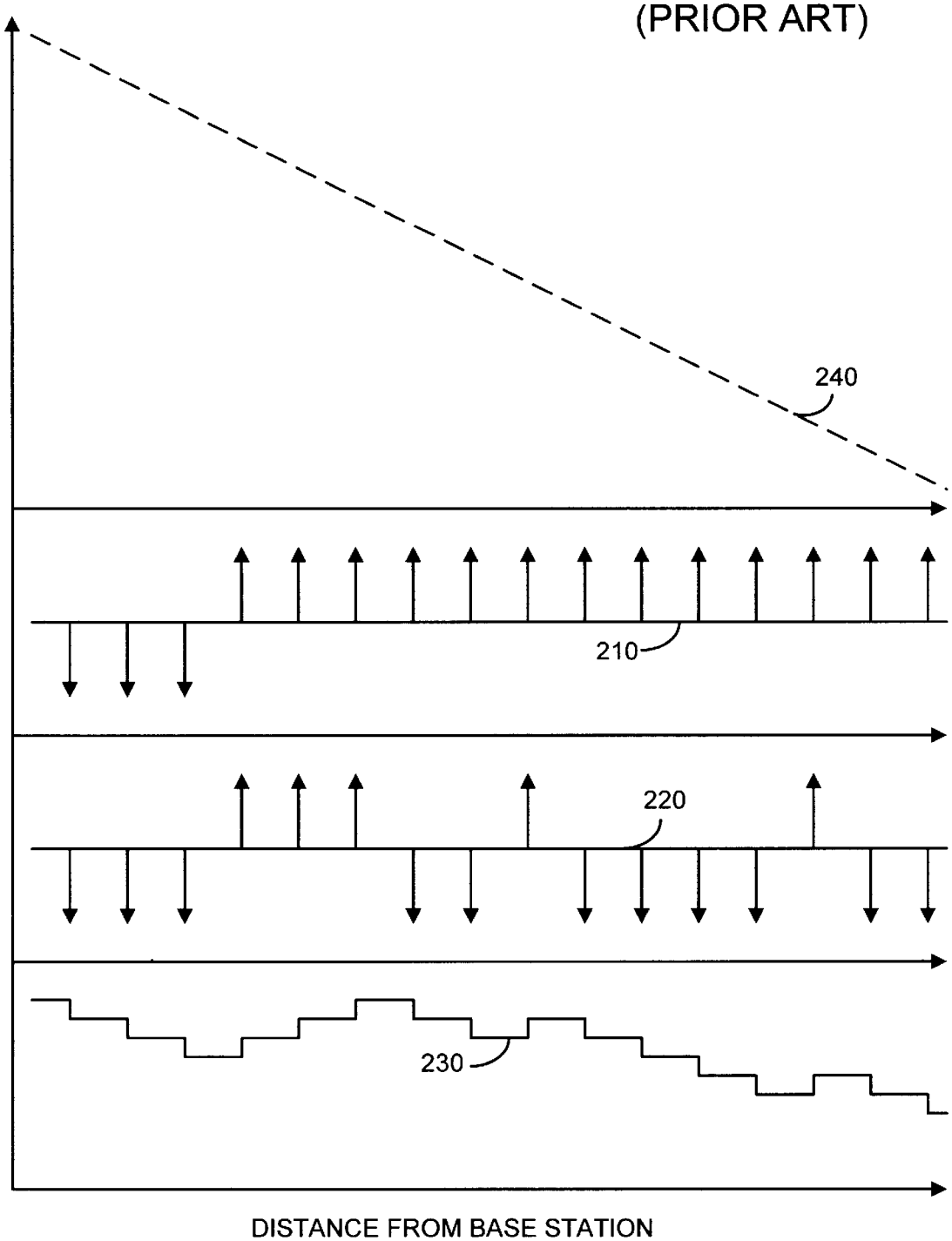
FIG. 3 is a graph displaying the power control commands from the base station, the power control commands as received by the mobile station the resulting change in the output power of the mobile station, and the mobile station received signal strength indicator as a function of the distance from the base station, in accordance with prior art systems.

Refer now to FIG. 3 for a graph displaying an example of power control commands 210 from the base station 100 (FIG. 2), power control commands 220 as received by the mobile station 120 (FIG. 2), resulting change in the output power 230 of the mobile station 120 (FIG. 2), and mobile station received signal strength indicator 240 as a function of the distance from the base station 100 (FIG. 2) in accordance with the prior art. The power control commands 210 from the base station 100 (FIG. 2) notify the mobile station 100 (FIG. 2) to increase its output power (the upwards arrow) or to decrease its output power (the downwards arrow). The power control commands 220 as received by the mobile station 120 (FIG. 2) are initially accurate when the mobile station 120 (FIG. 2) is close to the base station 100 (FIG. 2).

However, as the mobile station 120 (FIG. 2) moves further away from the base station 100 (FIG. 2), the mobile station 120 (FIG. 2) begins to receive some of the power control commands erroneously. The output power 230 of the mobile station 120 (FIG. 2) shows the effect of the received power commands. Since the mobile station 120 (FIG. 2) continues to erroneously receive the power control commands, the power output 230 may actually decrease as the mobile station 120 (FIG. 2) moves farther away from the base station 100 (FIG. 2). This is contrary to the desired behavior of maintaining or increasing the output power 230 as distance from the base station 100 (FIG. 2) increases. Thus. FIG. 3 illustrates the problem of many prior art systems.

Figure 4:
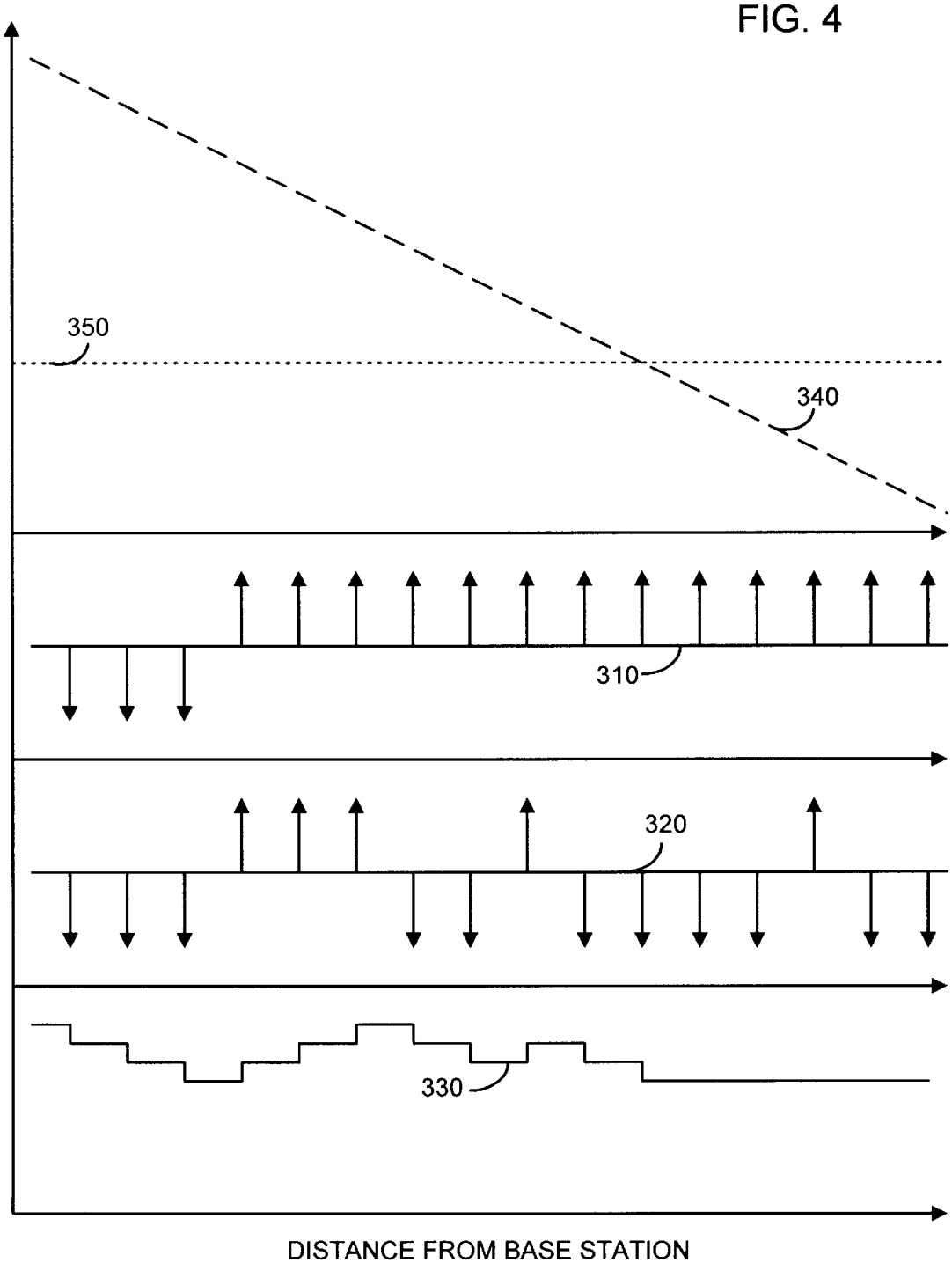
FIG. 4 is a graph displaying the effect of the received power threshold comparison on the actions taken by the mobile station pertaining to its output transmitted power as it moves constantly further away from the base station, in accordance with a first preferred embodiment of the present invention.

Refer now to FIG. 4 for a graph displaying an example of power control commands 310 from the base station 100 (FIG. 2), power control commands 320 as received by the mobile station 120 (FIG. 2) resulting change in the output power 330 of the mobile station 120 (FIG. 2), and mobile station received signal strength indicator 340 as a function of the distance from the base station 100 (FIG. 2), according to the first preferred embodiment of the present invention. Line 350 displays the power level threshold for the RSSI as specified by the base station 100 (FIG. 2) in a message,e containing the PWR_CNTL_THRESH$_s$ parameter. In a situation similar to that shown in FIG. 3 as the mobile station 120 (FIG. 2) moves further away from the base station 100 (FIG. 2), the mobile station 120 (FIG. 2) begins to receive the power control commands 310 from the base station 100 (FIG. 2) erroneously. However, when the RSSI 340 drops below the threshold 350 as specified by the PWR_CNTL_THRESH$_s$ parameter, the mobile station 120 (FIG. 2) ignores any power control command 320 it receives from the base station 100 (FIG. 2). The presence of the threshold 350 prevents the transmitted output power 330 of the mobile station 120 (FIG. 2) from fluctuating wildly.

Figure 5:
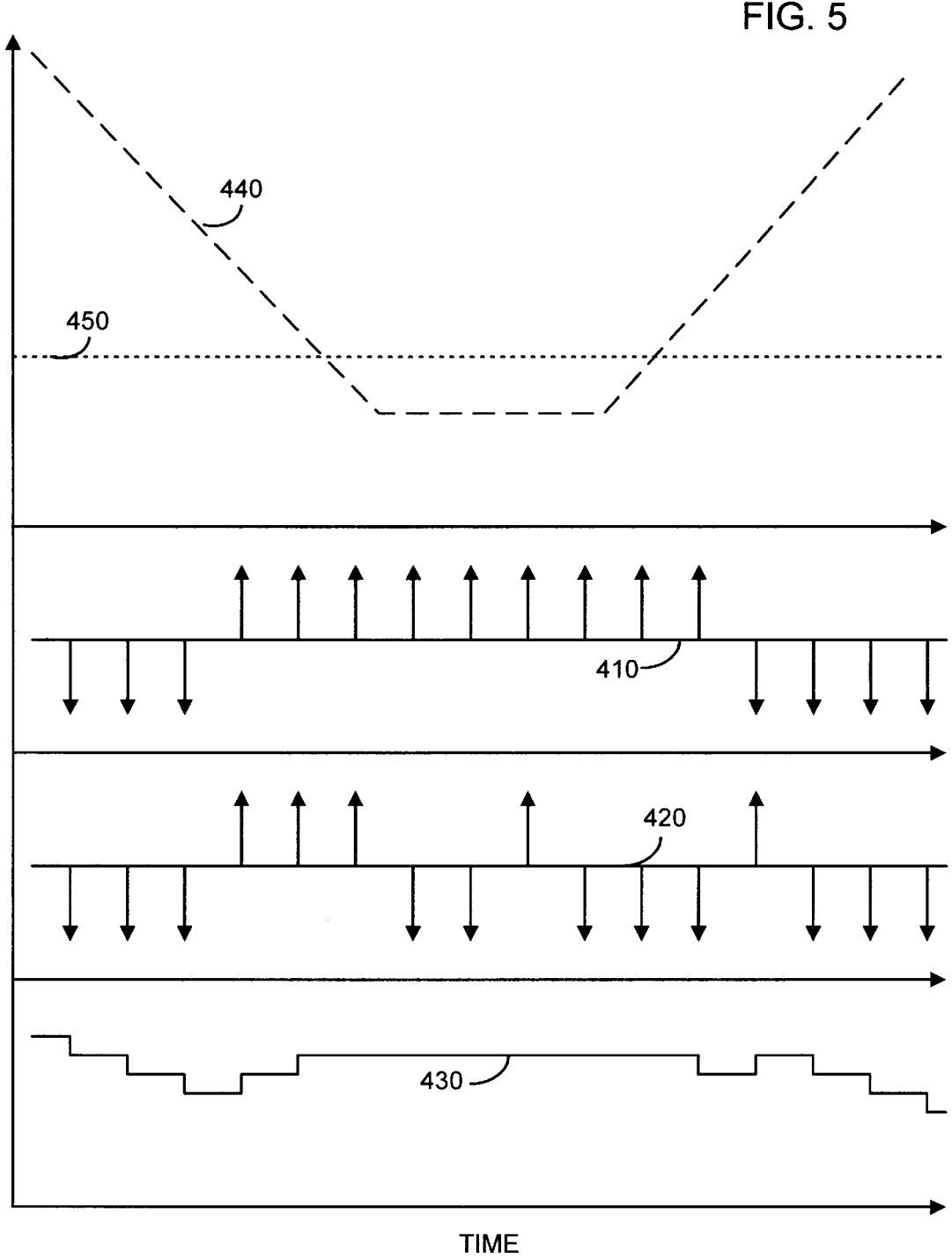
FIG. 5 is a graph displaying the effect of the received power threshold comparison on the actions taken by the mobile station pertaining to its output transmitted power as it first moves further away from the base station and then moves closer to the base station, in accordance with a first preferred embodiment of the present invention.

Refer now to FIG. 5 for a graph displaying an example of power control commands 410 from the base station 100 (FIG. 2), power control commands 420 as received by the mobile station 120 (FIG. 2), resulting change in the output power 430 of the mobile station 120 (FIG. 2), and mobile station received signal strength indicator 440 as a function of time. Initially, the mobile station 120 (FIG. 2) is close to the base station 100 (FIG. 2) and begins to move away from the base station 100 (FIG. 2). After a small amount of time, the mobile station 120 (FIG. 2) begins to move back towards the base station 100 (FIG. 2). The RSSI 440 first drops as the mobile station 120 (FIG. 2) moves away and then increases as it moves back towards the base station 100 (FIG. 2). When the RSSI 440 drops below the threshold 450, the mobile station 120 (FIG. 2) stops responding 430 to the received power control commands 420 from the base station 100 (FIG. 2).

Figure 6:
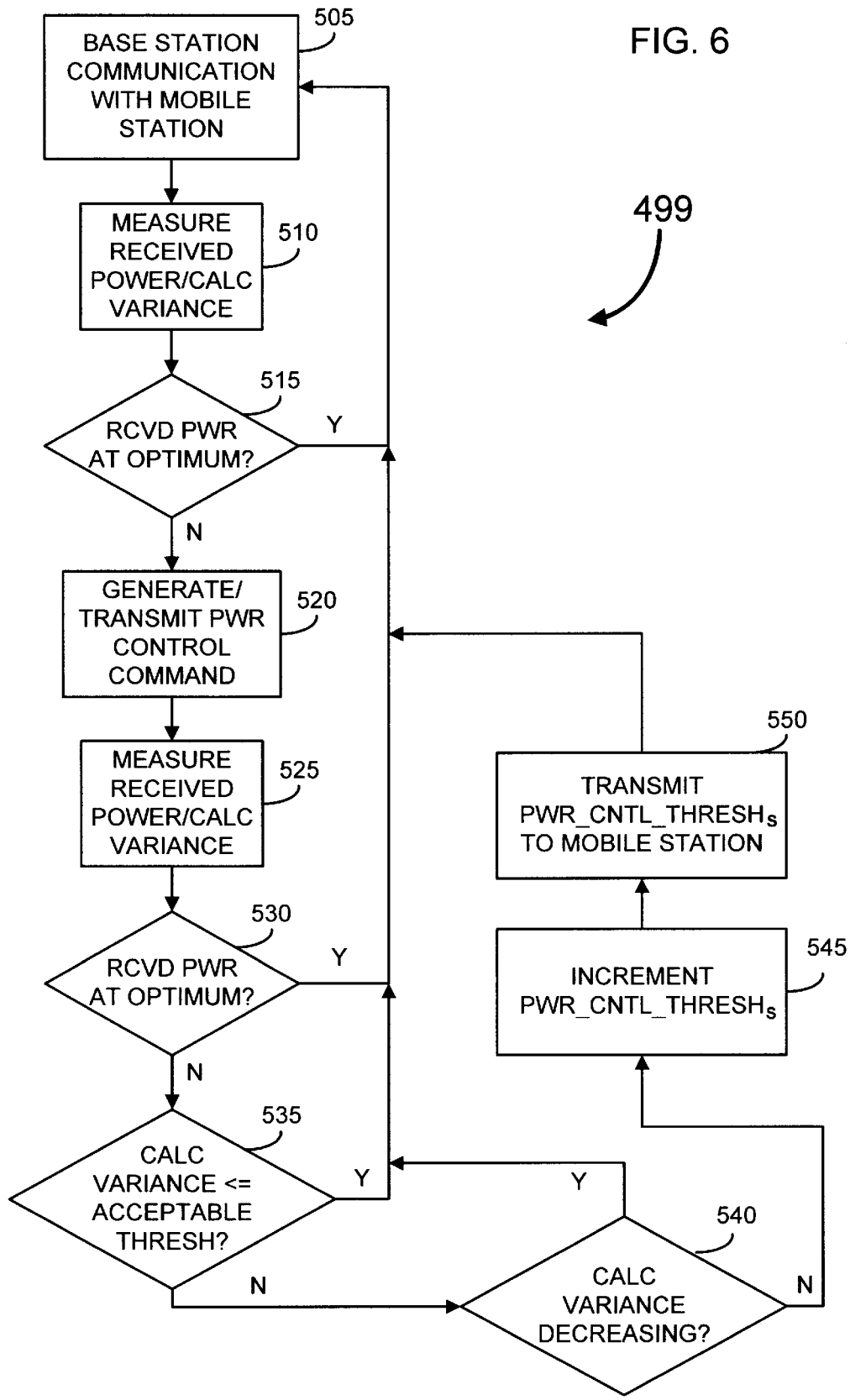
FIG. 6 is a flow chart representation of a portion of a power control process executing in the base station, in accordance with a first preferred embodiment of the present invention.

Refer now to FIG. 6 for a flow chart representation of a power control process 499 executing in the base station 100 (FIG. 2), in accordance with the first preferred embodiment of the present invention. In the process of communicating 505 with the mobile station 120 (FIG. 2), the base station 100 (FIG. 2) measures the received power from the mobile station 120 (FIG. 2). In the TIA/EIA/IS-95-A standard, the base station 100 (FIG. 2) measures the actual received power from six consecutive data symbols. After measuring the actual received power, the base station 100 (FIG. 2) calculates the variance of the actual received power with respect to the desired (optimal) received power 510. The base station 100 (FIG. 2) then compares the actual received power with the optimum received power 515. If the received power is approximately equal to the optimum received power, the base station 100 (FIG. 2) continues communications with the mobile station 120 (FIG. 2) and 505. If the actual received power is not approximately equal to the optimum received power, the base station 100 (FIG. 2) generates and transmits a power control command to the mobile station 120 (FIG. 2) to update (increase or decrease) its transmitted output power 520. The base station will then repeat the received power measurement and calculation of the variance of the received power 525. The base station 100 (FIG. 2) again compares the received power with the optimum received power 530. If the received power is not approximately equal to the optimum received power, the base station 100 (FIG. 2) will compare the variance of the received power with an acceptable threshold 535. If the variance is less than or equal to the acceptable threshold, the base station 100 (FIG. 2) resumes communications with the mobile station 120 (FIG. 2) and 505. If the variance is g,greater than the acceptable threshold, the base station 100 (FIG. 2) will determine if the variance in the actual received power has decreased from the last time the variance was calculated 540. If the variance has not decreased, the base station will increment the value of the parameter PWR_CNTL_THRESH$_s$ 545 and transmit threshold value, PWR_CNTL_THRESH$_s$, to the mobile station 120 (FIG. 2) and 550. After transmitting the parameter to the mobile station 120 (FIG. 2), the base station 100 (FIG. 2) resumes communications with the mobile station 120 (FIG. 2) and 505.

Figure 7:
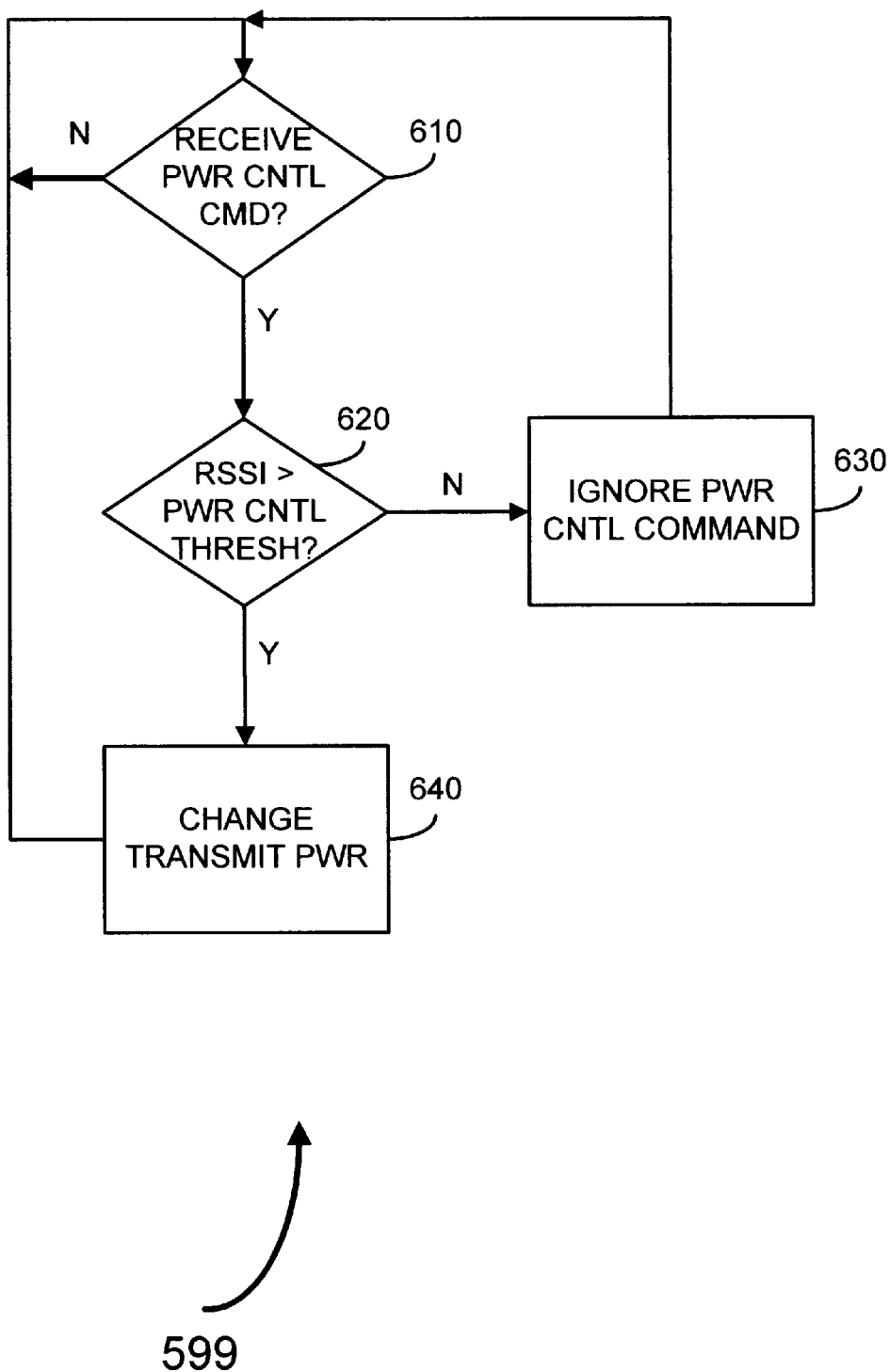
FIG. 7 is a flow chart representation of a portion of a power control process executing in the mobile station, in accordance with a first preferred embodiment of the present invention.

Refer now to FIG. 7 for a flow chart representation of the power control process 599 executing in the mobile station 120 (FIG. 2), in accordance with the first preferred embodiment of the present invention. In the normal closed loop power control as it is implemented in the TIA/EIA/IS-95A standard, the mobile station 120 (FIG. 2) will respond directly to the power control commands received. Power control commands increase or decrease mobile station power by one dB. It should be apparent to one skilled in the art that the quantity of one dB is for illustrative purposes and that other quantities are possible.

In the first preferred embodiment of the present invention, the base station 100 (FIG. 2) has a threshold, the PWR_CNTL_THRESH$_s$ that is used by the mobile station 120 (FIG. 2) to help ensure that the power control command received from the base station 100 (FIG. 2) is a valid power control command. In FIG. 7, the mobile station 120 (FIG. 2) first checks to see if it has received a new power control command 610. If a new power control command has indeed arrived, the mobile station 120 (FIG. 2) will compare the received signal strength indicator (RSSI) of the incoming signal from the base station 100 (FIG. 2) with the threshold as specified by the parameter, PWR_CNTL_THRESH$_s$ 620. If the RSSI does not exceed the value specified in PWR_CNTL_THRESH$_s$ (i.e., the RSSI is in a range of values below the power threshold value, PWR_CNTL_THRESH$_s$), the mobile station 120 (FIG. 2) ignores the power control command 630 and waits for the next power control command 610. If the RSSI does exceed the value specified in PWR_CNTL_THRESH$_s$ (i.e., the RSSI is in a range of values above the power threshold value, PWR_CNTL_THRESH$_s$), the mobile station 120 (FIG. 2) will change its output power per the power control command 640 and then wait for the next power control command 610.

The RSSI of the incoming signal from the base station 100 (FIG. 2) can be calculated as 10 times the log base 10 of the absolute value of the amplitude of the power control command times the amplitude of the pilot channel bit corresponding to the bit of the power control command divided by the total received power at the mobile station 120 (FIG. 2). This expressed as a mathematical expression is:

$$RSSI=10*\log_{10}\{|A_{pc}*A_{pilot}|/I_o\}$$

where $A_{pc}$ is the amplitude of the power control command, $A_{pilot}$ is the amplitude of the pilot channel corresponding to the power control command, and $I_o$ is the total received power at the mobile station 120 (FIG. 2).

In one implementation of the first preferred embodiment of the present invention, the PWR_CNTL_THRESH$_s$ parameter is represented as a two bit value. FIG. 8 shows examples of the values for PWR_CNTL_THRESH$_s$ and their corresponding dB value at which power control commands will be ignored. Note that when PWR_CNTL_THRESH$_s$ is equal to zero (0), the power control command is always acted upon by the mobile station 120 (FIG. 2) and 620 (FIG. 7).

The PWR_CNTL_THRESH$_s$ is transmitted to the mobile station 120 (FIG. 2) by the base station 100 (FIG. 2) via several different control messages. The base station can send the PWR_CNTL_THRESH$_s$ value in either the Channel Assignment Message, the Extended Channel Assignment Message, the Supplemental Channel Assignment Message, the Extended Handoff Direction Message, or the Power Control Message. The Channel Assignment Message is the message sent to the mobile station 120 (FIG. 2) by the base station 100 (FIG. 2) when the mobile station 120 (FIG. 2) is first synchronizing with the CDMA system and the base station 100 (FIG. 2) is making the assignment of the traffic channel. The Extended Channel Assignment Message is used by the base station 100 (FIG. 2) when it needs to make a reassignment of the traffic channel. The Supplemental Channel Assignment Message performs the same function as the Extended Channel Assignment Message but deals with the wide-band portion of the CDMA standard. The Extended Handoff Direction Message is the message used to perform the handoff of the control of the mobile station 120 (FIG. 2) from one base station 100 (FIG. 2) to a different base station. The Power Control Message is a new message that the base station 100 (FIG. 2) can transmit to the mobile station 120 (FIG. 2) at anytime when the base station 100 (FIG. 2) desires to update PWR_CNTL_THRESH$_s$. The Power Control Message is a very short message containing only PWR_CNTL_THRESH$_s$ plus a small amount of additional overhead.

In the previously discussed situation where the mobile station 120 (FIG. 2) is in the fringe coverage area between multiple base stations, the first preferred embodiment of the present invention specifies that the mobile station 120 (FIG. 2) will set its RSSI threshold to the highest level specified in PWR_CNTL_THRESH$_s$ by the multiple base stations. By setting the RSSI threshold to the highest specified level, the mobile station 120 (FIG. 2) reduces the probability of erroneously reciving a power control command because the mobile station 120 (FIG. 2) will ignore the power control commands which are received with low RSSI.

It should be noted that the values for PWR_CNTL_THRESH$_s$ can be any number of bits. Although the preferred embodiment utilizes two bits to convey threshold information, the present invention is not so limited.

In the preferred embodiment of the present invention, the initial value for PWR_CNTL_THRESH$_s$ zero. Only after sensing that the mobile station 120 (FIG. 2) is behaving erratically does the base station 100 (FIG. 2) send the mobile station a particular value for PWR_CNTL_THRESH$_s$. However, in a second embodiment of the present invention, the mobile station 120 (FIG. 2) initializes with a predetermined non-zero value for PWR_CNTL_THRESH$_s$ that is valid until the base station 100 (FIG. 2) updates the threshold value.

In a third embodiment of the present invention, the mobile station 120 (FIG. 2) has a specific value for PWR_CNTL_THRESH$_s$ hard coded into its circuitry. In this situation, no updating of the PWR_CNTL_THRESH$_s$ occurs.

While the embodiments of the present invention which have been disclosed herein are the preferred forms, other embodiments of the method and apparatus of the present invention will suggest themselves to persons skilled in the art in view of this disclosure. Therefore, it will be understood that variations and modifications can be effected within the spirit and scope of the invention and that the scope of the present invention should only be limited by the claims below. Furthermore, the corresponding structures materials acts, and equivalents of any means- or step-plus-function elements in the claims below are hereby described to include any structure material or acts for performing the claimed functions in combination with other claimed elements as specifically claimed.

We claim:

1. A power control method for preventing erroneous power changes in a mobile communications system, said method comprising steps of:

storing a power control threshold at a mobile station;

receiving power control signals at said mobile station;

determining a received signal strength at said mobile station;

comparing said received signal strength with said power control threshold; and controlling output power of said mobile station according to said power control signals only when said received signal strength is above said power control threshold.

2. The method of claim 1, wherein said power control threshold is a changeable variable, and wherein said method further comprises a step of changing said power control threshold.

3. The method of claim 2, wherein said changing step includes initializing said power control threshold at a value of zero.

4. The method of claim 2, wherein said changing step includes changing said power control threshold in relation to mobile station output power stability.

5. The method of claim 2, wherein said changing step includes a step of receiving a command from a base station instructing said mobile station to change said power control threshold.

6. The method of claim 2, wherein said changing step includes a step of incrementing said power control threshold responsive to determining that a variance of signals transmitted from said mobile station and received at said base station is above a second threshold value.

7. The method of claim 1, wherein said power control threshold defines a constant value that is unaffected by base station commands and mobile station output power stability.

8. A power control system for preventing erroneous power changes in a mobile communications system, comprising:

means for storing a power control threshold at a mobile station;

means for receiving power control signals at said mobile station;

means for determining a received signal strength at said mobile station;

means for comparing said received signal strength with said power control threshold; and means for ignoring said power control signals at said mobile station when said received signal strength is below said power control threshold.

9. The power control system of claim 8, wherein said power control threshold is a changeable variable, and wherein said power control system further comprises means for changing said power control threshold.

10. The power control system of claim 9, wherein said changing means includes means for initializing said power control threshold at a value of zero.

11. The power control system of claim 9, wherein said changing means includes means for changing said power control threshold in relation to mobile station output power stability.

12. The power control system of claim 9, wherein said changing means includes means for receiving a command from a base station instructing said mobile station to change said power control threshold.

13. The power control system of claim 9, wherein said changing means includes means for incrementing said power control threshold responsive to determining that a variance of signals transmitted from said mobile station and received at said base station is above a second threshold value.

14. The power control system of claim 8, wherein said power control threshold defines a constant value that is unaffected by base station commands and mobile station output power stability.

15. A power control system for preventing erroneous power changes in a mobile communications system, comprising:
   a mobile station memory configured to store a power control threshold at a mobile station;
   a power control signal receiver configured to receive power control signals at said mobile station;
   a mobile station received signal strength detector;
   a comparator configured to compare said received signal strength with said power control threshold; and
   an output power controller configured to ignore said power control signals at said mobile station when said received signal strength is below said power control threshold.

16. The power control system of claim 15, wherein said power control threshold is a changeable variable, and wherein said power control system includes further logic configured to change said power control threshold.

17. The power control system of claim 16, wherein said logic includes logic configured to initialize said power control threshold at a value of zero.

18. The power control system of claim 16, wherein said logic includes logic configured to change said power control threshold in relation to mobile station output power stability.

19. The power control system of claim 16, wherein said logic includes logic configured to receive a command from a base station instructing said mobile station to change said power control threshold.

20. The power control system of claim 16, wherein said logic includes logic configured to increment said power control threshold responsive to determining that a variance of signals transmitted from said mobile station and received at said base station is above a second threshold value.

21. The power control system of claim 15, wherein said power control threshold defines a constant value that is unaffected by base station commands and mobile station output power stability.

* * * * *